United States Patent [19]
Robbins

[11] Patent Number: 5,193,724
[45] Date of Patent: Mar. 16, 1993

[54] BICYCLE COVER

[76] Inventor: Donald M. Robbins, P.O. Box 4144, Vancouver, Wash. 98662

[21] Appl. No.: 766,585

[22] Filed: Sep. 27, 1991

[51] Int. Cl.⁵ .............................................. B62J 19/00
[52] U.S. Cl. .................................. 224/31; 224/30 A; 150/167
[58] Field of Search ................. 224/302, 304, 31, 328, 224/42.03 B, 34, 273; 150/166, 167, 154; 135/88; 296/78.1, 136; 206/335; 383/4, 66, 88

[56]  References Cited
U.S. PATENT DOCUMENTS

| | | | |
|---|---|---|---|
| 3,820,651 | 6/1974 | Levy | 150/167 X |
| 3,886,988 | 6/1975 | Garrett et al. | 150/167 X |
| 3,968,913 | 7/1976 | Weed et al. | 150/167 X |
| 4,009,744 | 3/1977 | Joslyn | 224/42.03 B X |
| 4,356,831 | 11/1982 | Adams | 150/167 |
| 4,598,725 | 7/1986 | Brewer | 135/88 X |
| 4,637,534 | 1/1987 | Leppek | 224/31 X |
| 4,715,646 | 12/1987 | Goffi et al. | 150/167 X |
| 4,944,340 | 7/1990 | Tortorich | 224/42.03 B X |
| 4,976,389 | 12/1990 | McLellan et al. | 224/328 |
| 5,062,560 | 11/1991 | Wasden | 224/328 |

FOREIGN PATENT DOCUMENTS

| | | | |
|---|---|---|---|
| 950059 | 10/1956 | Fed. Rep. of Germany | 150/167 |
| 291975 | 10/1953 | Switzerland | 150/167 |
| 292628 | 11/1953 | Switzerland | 150/167 |

*Primary Examiner*—Henry J. Recla
*Assistant Examiner*—Glenn T. Barrett
*Attorney, Agent, or Firm*—Eugene M. Eckelman

[57] ABSTRACT

A bag like main cover has side wall panels closed at the rear but open at the bottom and front. The top is closed from the rear to a point short of the front, leaving open top edges adjacent the front to fit around the upright gooseneck of the bicycle handlebars. Matching Velcro strips are attached to the side walls in the areas of the open portions thereof for releasably securing edges of the cover to lower portions of the bicycle and also to hold weather tight folds of the cover around the gooseneck. A hood-like auxiliary cover is shaped to releasably fit on and protect the handlebars and also receives the main cover therein for storing it when not in use. The auxiliary cover also has Velcro sealing strips that hold it on handlebars when in use and also strap it and the enclosed main cover to a bicycle portion when not in use.

4 Claims, 2 Drawing Sheets

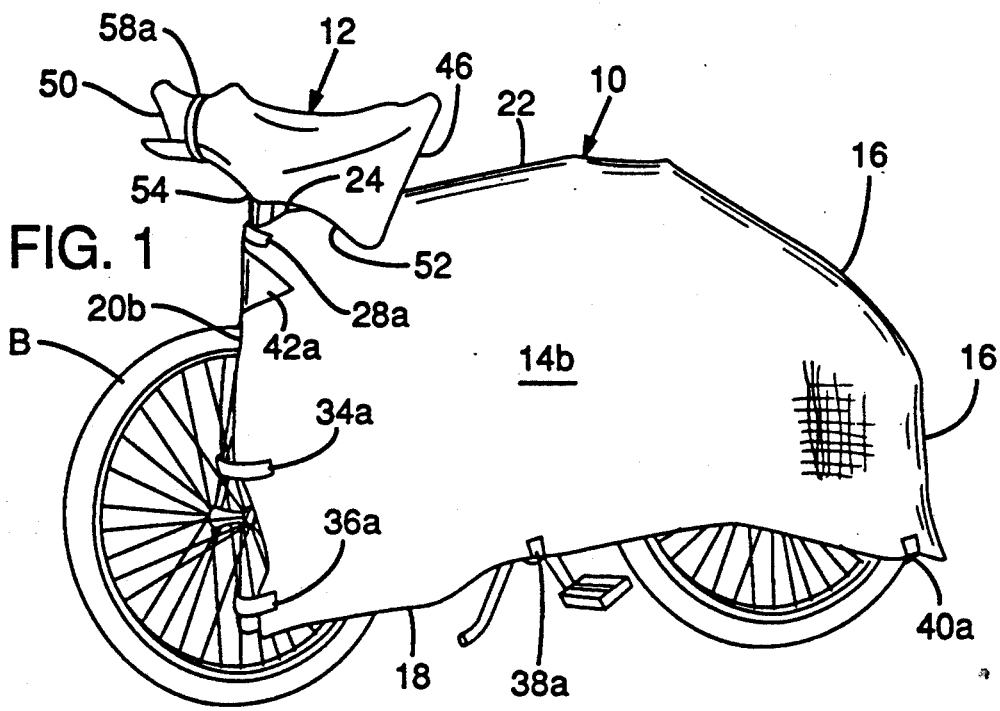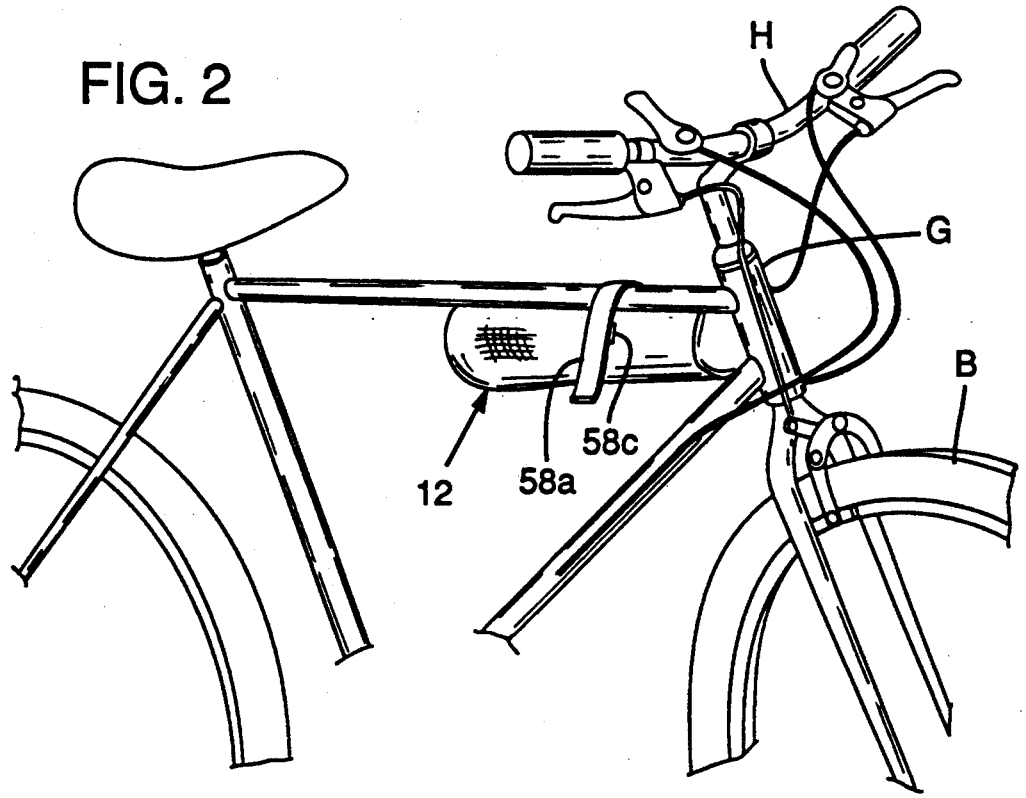

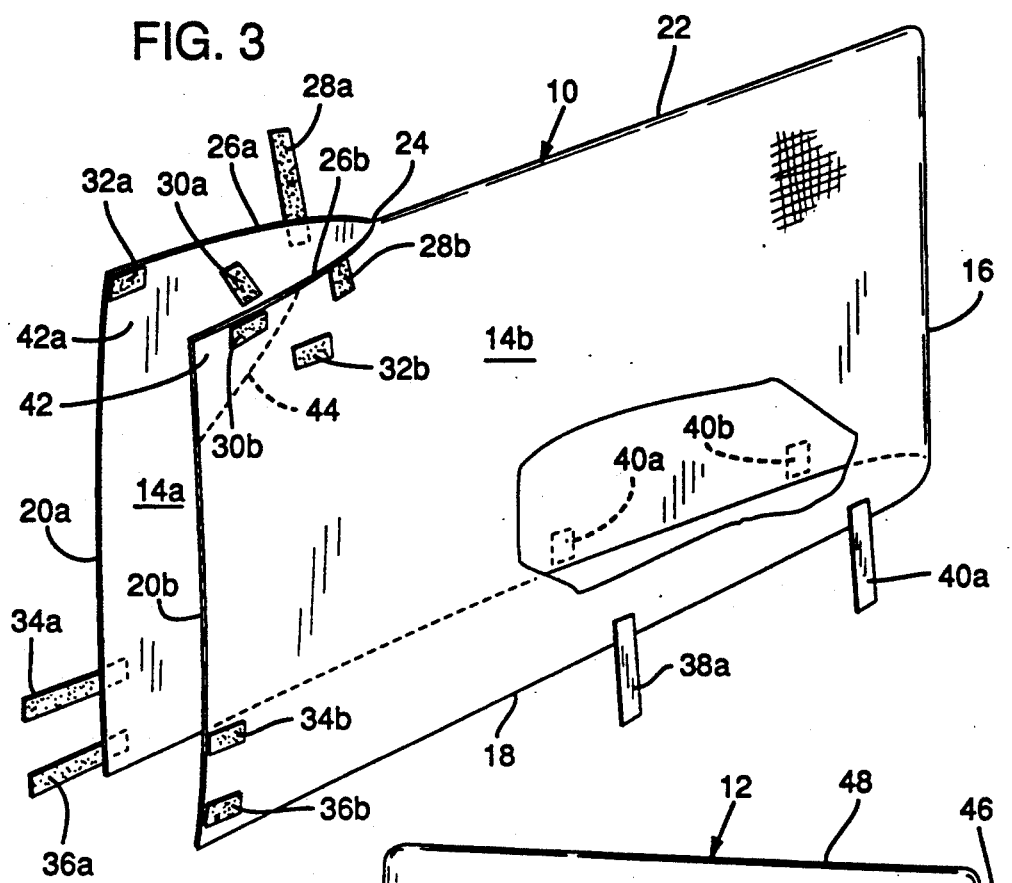
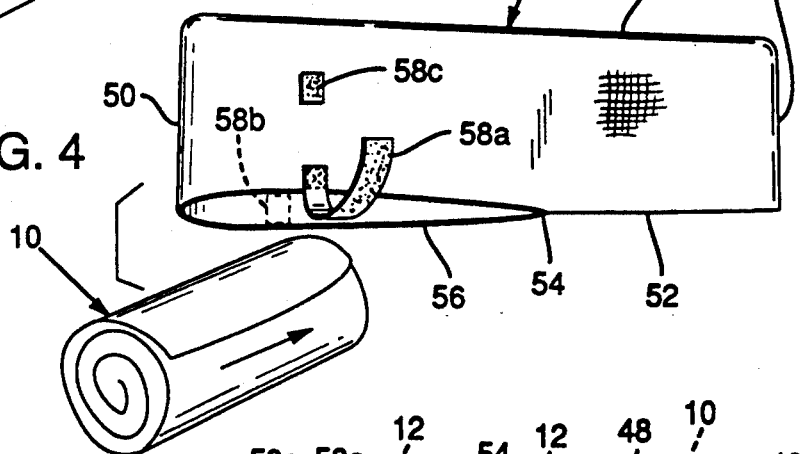
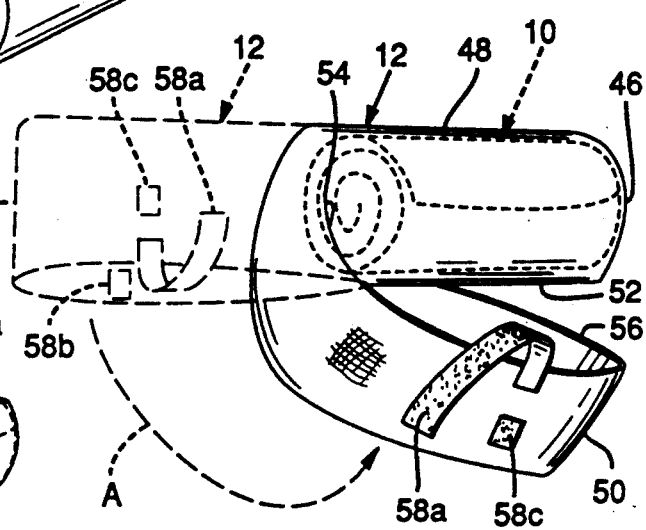
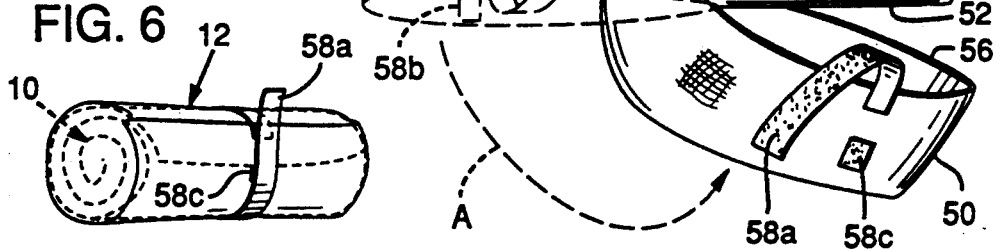

BICYCLE COVER

BACKGROUND OF THE INVENTION

This invention relates to a new and useful bicycle cover.

When bicycles are parked such as at home, at school, or other places, or are being transported on bicycle carriers, they are exposed to the weather and thus are subjected to deterioration of their finish and mechanical parts. It is known heretofore to place a bag-like cover over bicycles or the like when they are not being used but such covers are deficient in many respects. For example, these covers will not remain in place on the bicycle under strong wind conditions, such as when being transported on a bicycle carrier, unless they are hand tied in place which of course is very inconvenient. Also, prior covers make no provision for folding them or otherwise reducing them into a compact package for carrying especially on the bicycle itself. Further yet, provision has not been made to protect the handlebars.

SUMMARY OF THE INVENTION

According to the present invention and forming a primary objective thereof, a bicycle cover is provided that amounts to a valuable improvement over prior covers.

Another object of the invention is to provide a bicycle cover having a novel bag-like main cover that provides a substantially sealed, easy to install and remove enclosure for the bicycle and also an enclosure that will positively remain in place when mounted on the bicycle.

A further object is to provide a separate or auxiliary cover capable of being fitted over the handlebars and protecting them and constructed whereby to form an enclosing package for the main cover when folded or rolled into a small unit.

In carrying out the objectives of the invention, the cover includes side wall panels and a closed rear portion. The bottom and front portions of the cover are open to allow it to fit down over a bicycle. The top portion of the cover is closed from the rear of the cover to a point short of the front, leaving open top edges arranged to fit around the upright gooseneck of the bicycle. The open top edges of the front portion of the cover are associated with securing means which releasably secure these edges around the upright bicycle gooseneck. The cover also has securing means for securing front and bottom portions to the wheels and other structural elements of the bicycle. A separate auxiliary cover has a bottom edge that is partly closed and partly open, the open portion of this bottom edge allowing this auxiliary cover to be fitted over the handlebars. This bottom edge has securing means to hold the auxiliary member on the handlebars. The auxiliary cover is arranged to receive and fully enclose the main cover when the latter is folded or rolled into a small unit. The securing means for the bottom edge of the auxiliary cover are structured whereby to hold the auxiliary cover closed and also are arranged to strap it on a frame or other portion of the bicycle for storing the cover assembly until it is again needed.

The invention will be better understood and additional objects and advantages will become apparent from the following description taken in connection with the accompanying drawings.

BRIEF DESCRIPTION OF THE DRAWINGS

FIG. 1 is a perspective view of the present main cover and the auxiliary cover as mounted on a bicycle.

FIG. 2 is a perspective view of a bicycle showing a compacted condition of the main cover enclosed in the auxiliary cover and attached to the bicycle for convenient storage.

FIG. 3 is a perspective view of the present cover apart from a bicycle.

FIG. 4 is a perspective view of the auxiliary cover and showing the main cover compacted in size and in a step of being inserted in the auxiliary cover.

FIG. 5 is a view similar to FIG. 4 but showing the main cover enclosed within the auxiliary cover and the latter being folded for reducing the entire assembly to a compact unit; and FIG. 6 is a perspective view of the folded assembly capable of being suitably carried such as on the bicycle, as shown in FIG. 2.

DETAILED DESCRIPTION OF A PREFERRED EMBODIMENT

The invention comprises a main cover 10, FIGS. 1 and 3, and an auxiliary cover 12, FIGS. 1, 2 and 4–6. FIG. 1 shows the covers in place for protecting a bicycle B and its handlebars H and FIG. 2 shows the two covers in compacted form and strapped to a bicycle. These covers are made of any suitable flexible and lightweight sheeting that is waterproof and capable of being folded.

The main cover 10 comprises a pair of side wall panels 14a and 14b closed at the rear 16 and open at the bottom 18 for fitting down over a bicycle. The front of the cover is also open, the wall panels terminating in front edges 20a and 20b, respectively.

The top 22 of the wall panels is closed from the rear to a point 24 short of the front. Top open edges 26a and 26b lead from the point 24 to the front edges 20a and 20b, respectively. The front portion of the cover at this open end is associated with releasable securing means such as Velcro as follows. First matching Velcro strips 28a and 28b are secured to outer surfaces of the top edges 26 and 26b, respectively, just forward of the point 24. Strip 28a is somewhat elongated. Second matching Velcro strips 30a and 30b are secured on the respective wall panels 14a and 14b, the strip 30a being secured on the inner surface of the wall panel 14a a few inches down from the top and about halfway between the front edge 20a and the point 24. Velcro strip 30b is secured adjacent the top edge 26b a short distance rearward of the front edge 20b. Third matching Velcro strips 32a and 32b are secured on the respective wall panels 14a and 14b, the strip 32a being on the inner surface of the wall panel 14a at the corner of the front and top edge and the matching strip 32b being on the exterior surface of the wall panel 14b about halfway between the front edge 20b and the point 24 and 2 or 3 inches down from the top edge.

Additional matching Velcro strips are provided at the front and bottom of the cover, namely, a pair of matching strips 34a, 34b and 36a, 36b are secured to edge portions 20a and 20b, respectively, at the front adjacent bottom, and in addition pairs of matching strips 38a, 38b and 40a, 40b are secured to opposite outer surfaces of the wall panels 14b and 14a, respectively, at an intermediate point and adjacent the rear.

For mounting the main cover 10 on a bicycle B, all the matching Velcro strips are released from each other and the cover slipped down over the rearward portion and over the main frame up to the gooseneck G of the bicycle. Velcro strips 34, 34a and 34b, 36a and 36b, 38a and 38b, and 40a and 40b adjacent portions of the bicycle, such as to frame members, spokes, etc. as shown in FIG. 1. Matching Velcro strips 40a, 40b at the rear can engage a lower portion of the rear tire of the bicycle if desired for holding this portion of the cover down in a firm position. The edges 26a and 26b and the upper portion of the wall panels with their Velcro strips are then secured in a substantially weather-tight fit around the gooseneck of the bicycle as follows: First, the Velcro strip 28a is brought down in front of the gooseneck and firmly attached tensionwise to its matching portion 28b. Thereupon, the top front corner of wall panel 14b, designated by the numeral 42, is folded inwardly in triangular form on a fold line 44 to bring the Velcro strip 30b into matching face relation with the Velcro strip 30a. This tightens the folded wall portion 42 around the gooseneck and then the upper front corner portion 42a of the other wall 14a is folded over the top of the folded corner 42 to secure the Velcro strip 32a on the Velcro strip 32b. This double fold closes the cover tightly in a substantially weather tight fold around the gooseneck of the bicycle.

Auxiliary cover 12 comprises a hood-like member closed at its rear 46, its top 48, and its front 50. The bottom 52 is closed from the rear to an intermediate point 54, the remaining portion 56 being open. Velcro strips 58a and 58b are attached to opposite exterior surfaces of the hood adjacent the opening 56, and in addition a strip 58c arranged to be matched with the strip 58a is provided on the same surface as the latter but spaced toward the top 48 in alignment therewith.

In use, the auxiliary cover 12 is arranged to cover the handlebars H, this cover being slipped over the handlebars with the latter entering the opening 56. To secure this cover on the handlebars, the strip 58a is pulled down tightly around and under the handlebars and then engaged with its matching strip 58b.

When the covers are removed from the bicycle, the auxiliary cover 12 serves as a package or holder for the main cover 10. More particularly, the main cover 10 is folded or rolled into a compact package as shown in FIGS. 4-6 and inserted into the opening 56 of the auxiliary cover, FIG. 5. Thereupon, the hood-like end of the auxiliary cover is folded in the direction of arrow A, FIG. 5, under and up over the rear end, and also up and over the top into a compact package. When this enclosure of the main cover is made, the entire assembly can be rolled lengthwise and the elongated Velcro strip 58, which will still be on the exterior, is wrapped under and fully around to the strip 58c whereby to close the opening 56. Strip 58a is sufficiently elongated such that it can also wrap around a frame member, such as shown in FIG. 2, before engaging its matching strip 58c, thus holding the entire package on the bicycle until the covers are again needed.

It is thus apparent that the present cover provides an efficient enclosure for a bicycle and at the same time can be compacted in size and convenient for carrying on the bicycle when not in use. The Velcro strips seal the bicycle against the weather and as arranged on the covers hold them positively in place for storage and transportation.

The invention can also be used for covering two bicycles. For this purpose, it is merely widened at the top and some of the Velcro connections that comprise straps are made longer. Otherwise, the cover closes over two goosenecks the same as with one bicycle and the front and bottom Velcro connections similarly attach to wheel and structural portions.

It is to be understood that the form of my invention herein shown and described is to be taken as a preferred example of the same and that various changes in the shape, size and arrangement of parts may be resorted to without departing from the spirit of my invention, or the scope of the subjoined claims. The cover of the invention can be used on similar vehicles as well, such as motorcycles.

Having thus described my invention, I claim:

1. A bicycle cover comprising:
   a bag-like member having a front portion, a rear portion, top and bottom portions, and side portions,
   the side portions of said bag-like member including wall panels capable of covering sides of a bicycle,
   the rear portion of said bag-like member being closed to cover a rear of the bicycle,
   the bottom portion and front portion of said bag-like member being open to allow the cover to fit down over the bicycle,
   the top portion of said bag-like member being closed from the rear portion thereof to a point short of the front portion, leaving open top edges to fit around an upright gooseneck of the bicycle,
   securing means on the front portion of said bag-like member releasably securing said open top edges around an upright gooseneck of the bicycle,
   and a hood-like member separate from said bag-like member and having front and rear wall panels closely fully across top and side edges thereof,
   the said hood-like member having a bottom edge that is partly closed and partly open,
   the open portion of said bottom edge allowing said hook-like member to be fitted over handlebars of the bicycle in enclosing relation.

2. The bicycle cover of claim 1 including securing means adjacent the partly open portion of said bottom edge of the hood-like member releasably closing said open portion and securing said hood-like member over a bicycle handle bars.

3. The bicycle cover of claim 1 wherein said hood-like member is arranged to receive said bag-like member through said partly open portion in a non-use condition of the bag-like member, said securing means also being arranged to hold said partly open portion closed to fully enclose said bag-like member.

4. The bicycle cover of claim 3 wherein said securing means is also arranged to hold the fully enclosed bag-like on a structural portion of the bicycle.

* * * * *